(12) United States Patent
Bergier et al.

(10) Patent No.: US 11,682,884 B2
(45) Date of Patent: Jun. 20, 2023

(54) EXTERNAL RACKING DEVICE

(71) Applicant: Schneider Electric Industries SAS, Rueil Malmaison (FR)

(72) Inventors: Laurent Bergier, Budapest (HU); Gergely Smeller, Kunszentmiklós (HU); Marcell Soterius, Budapest (HU)

(73) Assignee: Schneider Electric Industries SAS, Rueil Malmaison (FR)

(*) Notice: Subject to any disclaimer, the term of this patent is extended or adjusted under 35 U.S.C. 154(b) by 2 days.

(21) Appl. No.: 17/164,196

(22) Filed: Feb. 1, 2021

(65) Prior Publication Data

US 2021/0242668 A1  Aug. 5, 2021

(30) Foreign Application Priority Data

Feb. 4, 2020 (EP) ..................................... 20305100

(51) Int. Cl.
*H02B 3/00* (2006.01)
*H02B 11/127* (2006.01)
*H02B 11/04* (2006.01)
*H02B 11/06* (2006.01)

(52) U.S. Cl.
CPC ............... *H02B 3/00* (2013.01); *H02B 11/04* (2013.01); *H02B 11/06* (2013.01); *H02B 11/127* (2013.01)

(58) Field of Classification Search
CPC ................................. H02B 11/127; H02B 3/00
See application file for complete search history.

(56) References Cited

U.S. PATENT DOCUMENTS

| 5,453,587 A | 9/1995 | Hurley et al. | |
|---|---|---|---|
| 6,897,388 B2 | 5/2005 | Greer | |
| 7,019,230 B1 * | 3/2006 | Vaill | H02B 3/00 200/50.21 |
| 8,063,323 B1 * | 11/2011 | Ledbetter | H02B 11/127 200/50.21 |

(Continued)

FOREIGN PATENT DOCUMENTS

WO  WO-2022015153 A1 *  1/2022 ........... H02B 11/127

OTHER PUBLICATIONS

Specification. "Remote Racking Device", U.S. Appl. No. 61/379,846, filed Sep. 2, 2010, publically available on Mar. 6, 2012 when U.S. Patent Application Publication 2012/0055766 was published. (Year: 2012).*

(Continued)

*Primary Examiner* — Robert J Hoffberg
(74) *Attorney, Agent, or Firm* — Locke Lord LLP; Daniel J. Fiorello; Peter N. Fill

(57) ABSTRACT

An external racking device for remotely racking in and racking out an electrical circuit breaker from a cabinet. The racking device includes a motor head equipped with an electric motor, the electric motor being provided with a rotating shaft ended with an adaptor, and arranged to be coupled with a racking mechanism of an electrical circuit breaker, so that when driven in rotation, the shaft, depending of rotation, trigger either the racking in or the racking out of the circuit breaker from the cabinet. The external racking device further includes monitoring means intended to enable or to disable the operation of the electric motor depending on the status of a circuit breaker to be racked in or racked out from a cabinet.

18 Claims, 3 Drawing Sheets

(56) References Cited

U.S. PATENT DOCUMENTS

| | | | | |
|---|---|---|---|---|
| 8,151,452 B2* | 4/2012 | Ledbetter | ................ | H02B 3/00 |
| | | | | 200/50.21 |
| 8,156,639 B1* | 4/2012 | Ledbetter | ................ | H02B 3/00 |
| | | | | 200/50.21 |
| 8,164,875 B1* | 4/2012 | Ledbetter | ................ | H02B 3/00 |
| | | | | 361/115 |
| 8,307,545 B1* | 11/2012 | Ledbetter | ............ | H02B 11/127 |
| | | | | 200/50.21 |
| 8,395,065 B2* | 3/2013 | Zylstra | ................ | H02B 11/127 |
| | | | | 200/50.24 |
| 8,553,394 B2* | 10/2013 | Hawkins | ............. | H02B 11/127 |
| | | | | 361/608 |
| 8,604,369 B2* | 12/2013 | Greer | ....................... | H02B 3/00 |
| | | | | 200/50.24 |
| 8,671,556 B1* | 3/2014 | Ledbetter | ................ | H02B 3/00 |
| | | | | 29/418 |
| 9,520,248 B2* | 12/2016 | McClung | ................ | H02B 3/00 |
| 9,728,942 B2* | 8/2017 | McClung | ............... | H02B 11/02 |
| 10,404,043 B2* | 9/2019 | McClung | ............ | H02B 11/127 |
| 10,630,060 B2* | 4/2020 | Magno | ................ | H02B 11/127 |
| 2012/0305369 A1* | 12/2012 | Greer | ................ | H02B 11/127 |
| | | | | 200/50.24 |
| 2013/0037394 A1* | 2/2013 | Greer | ....................... | H02B 3/00 |
| | | | | 200/50.24 |
| 2013/0258103 A1* | 10/2013 | McClung | ................ | H02B 3/00 |
| | | | | 348/739 |
| 2019/0280467 A1 | 9/2019 | Hall et al. | | |
| 2020/0265572 A1* | 8/2020 | Rossano | ............ | G01N 21/8851 |

OTHER PUBLICATIONS

Extended European Searach Report for European Application No. 20305100.8-1201 dated Jun. 19, 2020, 8 pages.

* cited by examiner

EXTERNAL RACKING DEVICE

FIELD OF THE INVENTION

The present invention concerns an external racking device. In particular the present invention concerns an external racking device for racking in and/or racking out a medium voltage circuit breaker housed in a cabinet.

Notably, the present invention relates to an external racking device which the circuit breaker racking operations to be executed in safer conditions than known prior art device.

PRIOR ART

Medium voltage circuit breakers, that is to say operating at a voltage comprised in the 1 KV-52 KV voltage range, are commonly disposed in cabinets having for example a plurality of compartments. Notably, circuit breakers may be either stacked within one cabinet or disposed in any other suitable configuration within the cabinets. While in use, there is no need to manipulate or to operate on them out of their compartment.

It may however sometimes be necessary to insert ("to rack in") and/or to remove ("to rack out") said circuit breakers into or from their housing compartment, for example in order to perform a preventive maintenance, to replace a module, and even to work on downstream loads in safety conditions. However, such circuit breakers are quite heavy and require the use of a motorized extraction/insertion module. Furthermore, in order to reduce the electrical hazards, it may be further required that the extraction/insertion operation be executed in a remote manner.

The implementation of a motor at each circuit breaker level is a solution that most users try to avoid for cost reasons. Further, the multiplication of the number of motors also increases the maintenance costs.

It is therefore an alternative to use an external racking device.

To this regards, FIG. 1 illustrates an example of an external racking device 10 known from prior art.

The external racking device 10 comprises a base equipped with wheels for maneuvering and positioning said device 10 with respect to the cabinet housing the circuit breaker to be manipulated.

The device further comprises an elongated element extending upwardly with respect to the base, and a motor head coupled to the elongated element. In particular, the motor is arranged so that its height can be adjusted by sliding said motor along the elongated element.

The device 10 also comprises a motor mounted on the motor head and provided with a shaft and an adaptor operatively associated to the shaft. Notably, the adaptor is intended to be coupled to the circuit breaker and to be driven into rotation by the motor for executing the racking in and the racking out operation.

The motor is generally equipped with a mechanical torque limiter designed to limit the effort exerted by the motor on the circuit breaker racking mechanism in order to prevent the occurrence of damages on said mechanism.

The device is however not satisfactory.

Indeed, mechanical torque limiters are generally not designed to react in a sufficiently fast way to stop the effort exerted on the circuit breaker racking mechanism so that damages on said racking mechanism may still occur.

Furthermore, mechanical torque limiters need to be regularly calibrated to avoid any risk of dysfunction and damage of the circuit breaker racking mechanism and between two calibrations there is a potential risk of damage.

Besides, the operation of the circuit breaker with the external racking device is allowed whatever the status of said circuit breaker.

Finally, the positioning of the external racking device is critical. In particular, it is required that said device keeps its position while in operation to avoid that damages occur on the circuit breaker racking mechanism. However, the only implementation of brakes on the wheels is not sufficient to make sure that the external racking device is properly positioned and remains motionless with respect to the cabinet.

The documents U.S. Pat. No. 6,897,388, US2019280467 and U.S. Pat. No. 5,453,587 also disclose an external racking device.

It is therefore an object of the present invention to provide an external racking device which can be used in safer manner than known prior art devices.

Another object of the present invention is to provide an external racking device for which damaging of the racking mechanism is prevented or at least further limited.

SUMMARY OF THE INVENTION

The aforementioned objects are, at least partly, achieved by an external racking device for remotely racking in and racking out an electrical circuit breaker from a cabinet, the racking device comprising a motor head equipped with an electric motor, said electric motor being provided with a rotating shaft ended with an adaptor, and arranged to be coupled with a racking mechanism of an electrical circuit breaker, so that when driven in rotation, the shaft, depending of rotation, triggers either the racking in or the racking out of the circuit breaker from the cabinet, the external racking device being characterized in that it further comprises monitoring means configured to enable or to disable the operation of the electric motor depending on the status of a circuit breaker and/or a switchgear to be racked in or racked out from a cabinet.

According to one embodiment, the monitoring means comprise a wire connectable to the circuit breaker and/or a switchgear to be racked in or racked out.

According to one embodiment, the monitoring means are configured to monitor parameters related to the status of the circuit breaker position and/or a switchgear in a cabinet.

According to one embodiment, the electric motor is further provided with an electrical torque limiter configured to stop the electrical motor when said motor exerts a torque above a predetermined threshold.

According to one embodiment, the electrical torque limiter is further configured to constantly evaluate the torque exerted by the shaft while the external racking device is in operation, advantageously the torque is evaluated via measurements of a current feeding the electric motor so that when said current exceeds a predetermined current the operation of the external racking device is interrupted.

According to one embodiment, the external racking device comprises a human machine interface for setting said external racking device.

According to one embodiment, the external racking device comprises a remote control for controlling the racking in and the racking out operation.

According to one embodiment, the external racking device further comprises a chassis supporting the motor head, and a control box of the motor.

According to one embodiment, the chassis comprises a base provided with at least one upward element extending upwardly from the base and supporting the motor head.

According to one embodiment, the motor head is arranged so that its height can be adjusted by sliding said motor head along the upward element.

According to one embodiment, the external device further comprises wheels coupled to the base to permit a wheeled movement of the chassis.

According to one embodiment, the external racking device further comprises power means for powering the motor head.

According to one embodiment, power means comprise a rechargeable battery associated with a built in charger.

According to one embodiment, power means comprise an electrical cable.

According to one embodiment, the external racking device further comprises a docking module configured to detect the docking of the external racking device in front of a cabinet, advantageously, the docking module is configured to permit the operation of the external racking device only when said device is properly docked to the cabinet, even more advantageously docking module comprises at least one electromagnet configured to maintain the external racking device against the cabinet while operating a racking in or a racking out operation.

The invention also concerns a method for racking in and/or racking out a circuit breaker from a cabinet, and implementing the external racking device according to the present invention, the method comprising the steps of:
- coupling the rotating shaft ended with the adaptor with a racking mechanism of an electrical circuit breaker;
- determining the status of the circuit breaker via the monitoring means (109);
- enabling or disabling the operation of the electric motor of the external racking device depending on the status;
- operating the rack in or the rack out operation in case the operation of the electric motor is enabled.

BRIEF DESCRIPTION OF THE DRAWINGS

Other characteristics and advantages shall appear in the following description of embodiments of the external racking device according to the invention, given by way of non-limiting examples, in reference to the annexed drawings wherein.

DETAILED DESCRIPTION OF SPECIFIC EMBODIMENTS

An exemplary embodiment of an external racking device 100 for remotely racking in and racking out an electrical circuit breaker according to the present invention is shown in FIGS. 2 to 7.

Figure 1:
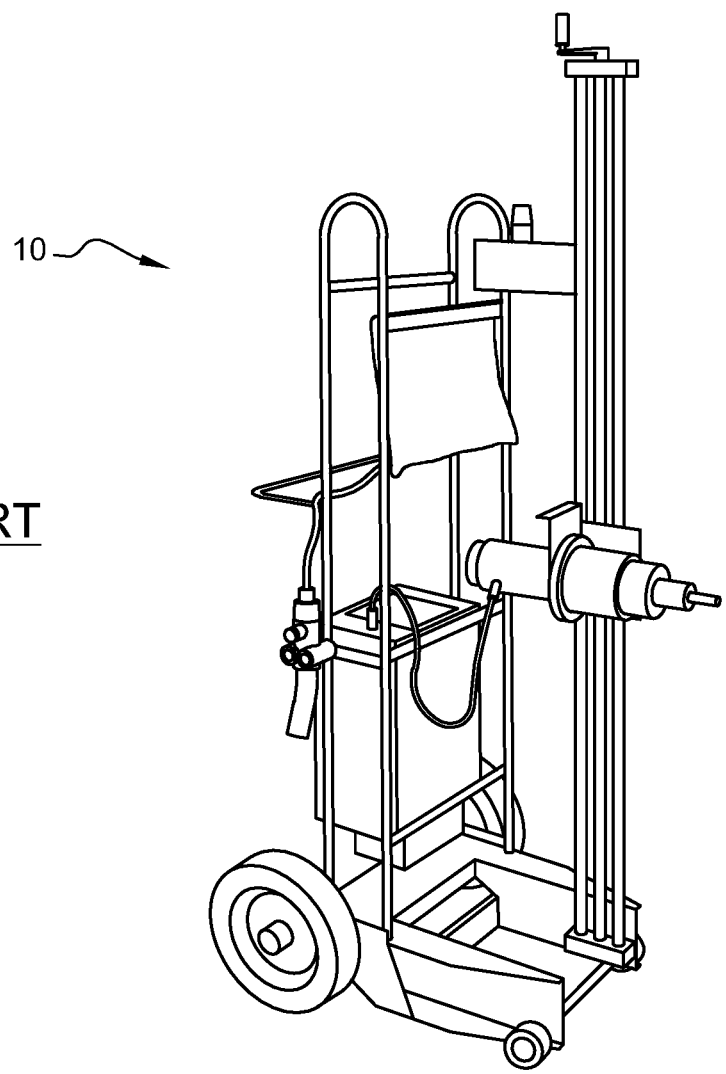
FIG. 1 is a representation of an external racking device known from prior art.
Figure 2:
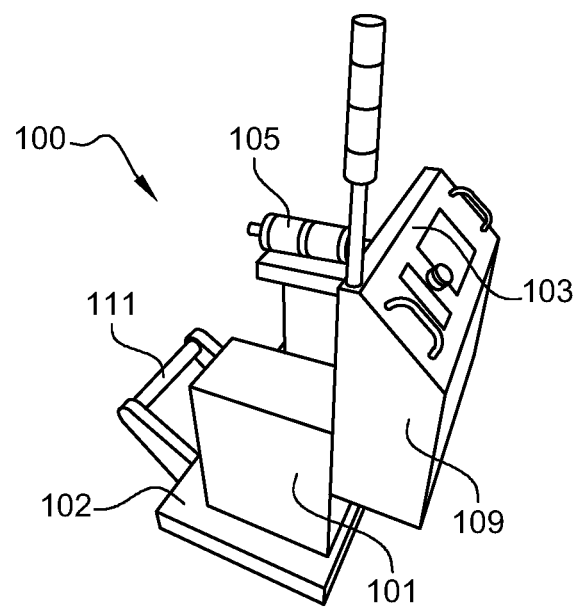
FIG. 2 is a representation of an external racking device according to an exemplary embodiment of the present invention.
Figure 3:
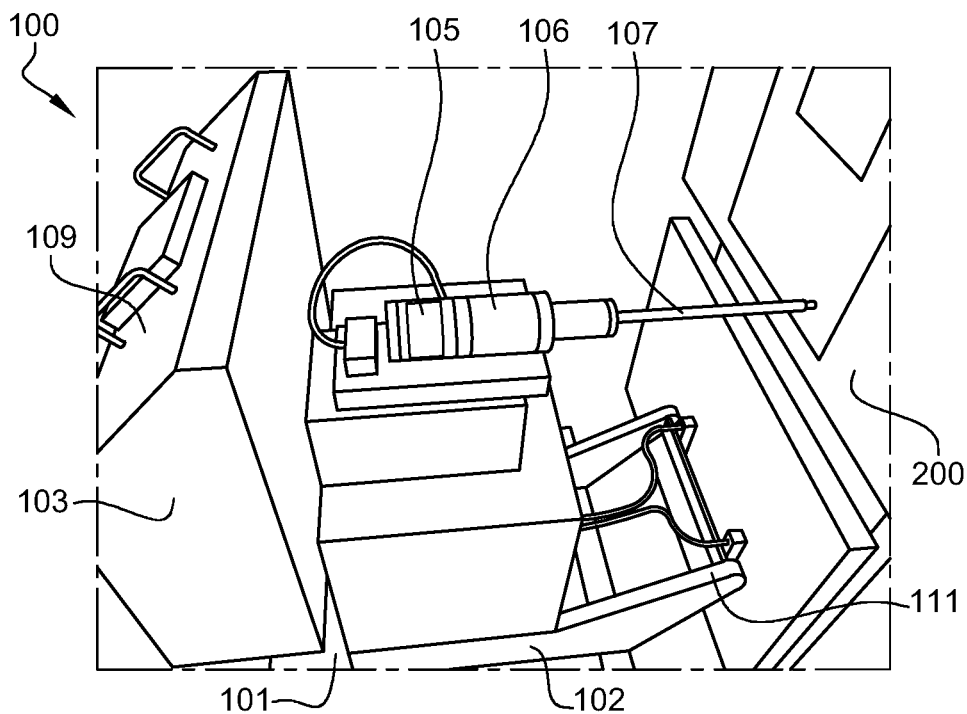
FIG. 3 is a representation of the external racking device according to the exemplary embodiment of the present invention, in particular, the external racking device is positioned in front of a cabinet housing a circuit breaker.

The external racking device 100 may comprise a chassis 101. The chassis may comprise a base 102, and at least one upward element 103 extending upwardly from the base 102 (FIGS. 2 and 3).

The base 102 may include wheels to permit a wheeled movement of the chassis 101.

For example, the chassis 101 may comprise a first pair of wheels disposed at opposite ends of the rear of the base 102, and a second pair of wheels disposed at opposite ends of the front of the base 102.

The first pair of wheels may be provided with a braking system.

The external racking device 100 further comprises a motor head 105, for example mounted on the upward element 103. In particular, the motor head 105 may be arranged so that its height can be adjusted by sliding said motor head 105 along the upward element 103.

The motor head 105 comprises a motor 106 provided with a shaft 107 terminated with an adaptor. In particular, the shaft 107 is arranged to be driven into rotation by the motor 106.

In particular, the shaft 107 is arranged to be inserted or coupled with the racking mechanism of a circuit breaker housed in a cabinet 200, so that when driven in rotation, said shaft 107, depending of its direction of rotation, triggers either the racking in or the racking out of the circuit breaker from the cabinet 200 (FIG. 3).

According to the present invention, the external racking device 100 further comprises monitoring means 109, for example a Programmable Logic Controller (hereafter "PLC"), inside a control box, intended to enable or to disable the operation of the electric motor 106 depending on the status of a circuit breaker to be racked in or racked out from a cabinet 200 (FIGS. 2 and 3).

By "status", it is meant the positioning and the electrical conditions of the circuit breaker. In particular, the status can be, but not limited to, the positioning of the circuit breaker within the cabinet, a close or an open state, the temperature, a usage counter, a maintenance state, and any information coming from the switchgear interlocking and signals.

In particular, the monitoring means 109 are configured to allow the operation of the external racking device only when the circuit breaker is in proper conditions. Notably, in normal operation, the monitoring means 109 can switch on a Variable Speed Drive (hereafter "VSD") of the electric motor 106. The external racking device may be further equipped with an emergency push button operation which is configured, when pressed, to switch off the power from the VSD (and the PLC).

The circuit breaker may be equipped with interlocks or other sensors configured to probe the status of said circuit breaker. Notably, the circuit breaker may comprise sensors or interlocks for:
- detecting the position (rack in or rack out) of said circuit breaker in the cabinet;
- indicating if the circuit breaker is in a close or open position;
- indicating if the circuit breaker needs a maintenance before being racked in;
- indicating the voltage and/or the current to be feed into the circuit breaker before being racked in.

Notably, the monitoring means 109 may be configured to not allow the racking out of the circuit breaker when safety conditions for the user or said circuit breaker are not fulfilled. In particular, racking out may be prevented when:
- an interlock detects an improper position of the circuit breaker;

an interlock detect an improper status of the earthing switch;

the circuit breaker is closed;

To this regard, the monitoring means 109 may be arranged for collecting data and/or parameters from the cabinet 200 or the circuit breaker to be racked in or out. In particular, the collected data and parameters may be processed in the control box disposed on the chassis. Considering this particular configuration of the control box, there is no need to install data processing unit within the cabinet(s) and, as a consequence limit the cost of the installation.

As an alternative, the data and/or the parameters can be directly collected and processed by the circuit breaker, and authorization to be operated (racked in or racked out) by the external racking device sent directly to the control box.

The control box may comprise any electronic device provided with a calculator and/or a CPU for processing said collected data and/or parameters.

Figure 5:
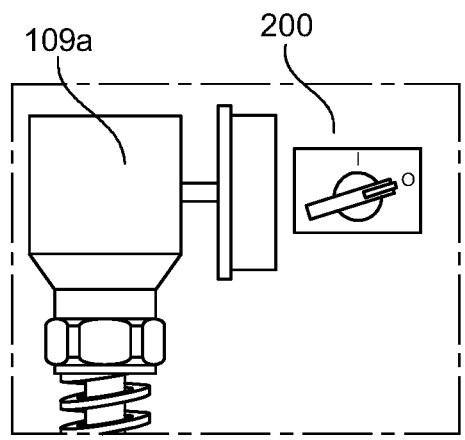
FIG. 5 is a representation of a wire connection between the external racking device and the circuit breaker.

The monitoring means 109 may comprise a wire 109a connectable to the switchgear to be racked in or racked out (FIG. 5).

The electric motor may be provided with an electrical torque limiter configured to stop the electrical motor when said motor exerts a torque above a predetermined threshold.

For example, the torque limiter may be configured to constantly evaluate the torque exerted by the shaft while the external racking device is in operation.

Advantageously the torque limiter may be configured to evaluate the torque exerted by the shaft via measurements of current feeding the electric motor so that when said current exceeds a predetermined current the operation of the external racking device is interrupted.

Figure 4:
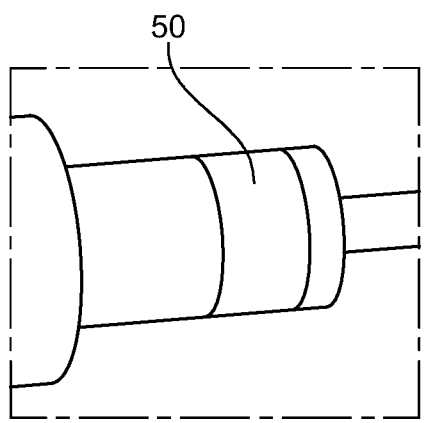
FIG. 4 is a representation of a mechanical torque limiter.

The electric motor may also comprise a mechanical torque limiter 50 (FIG. 4).

The external racking device 100 may further comprise power means for powering the motor head, and eventually the control box.

In particular, the power means for powering may comprise a rechargeable battery associated with a built in charger, or an electrical cable.

The external racking device 100 may further be provided with a human machine interface 110 (hereafter "HMI") for controlling or setting the external racking device.

The HMI 110 may be disposed in a panel of the control box.

In particular, the HMI may be a touch screen interface configured to display the different operating menu of the external racking device 100.

In particular, the user may have access, via the HMI, to the status of both the circuit breaker and the external racking device, the calibration menu, and any other setting screens associated with the operation of said device.

Figure 6:
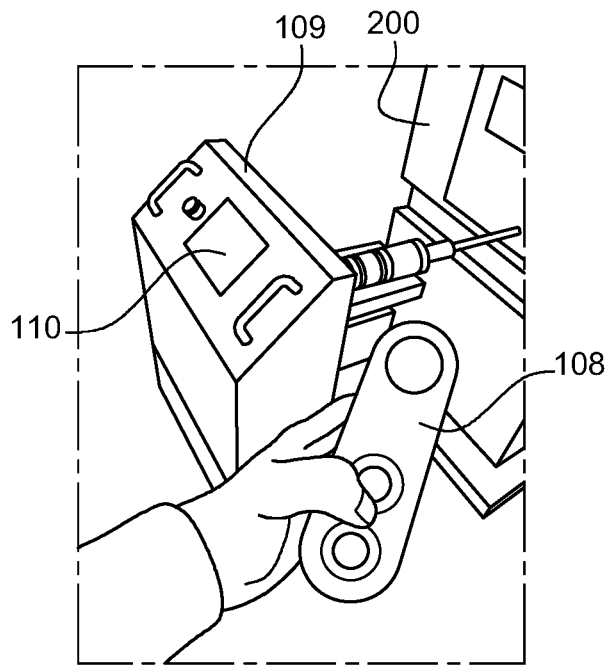
FIG. 6 is a representation of the external racking device docked to the cabinet.

The external racking device may further comprise a wireless remote control 108 for operating the external racking device 100 (FIG. 6). This wireless configuration allows the user to stay away, in particular up to 100 meters, from the cabinet. In other words, the wireless configuration further improves the safety of the user while operating the external racking device.

Figure 7:
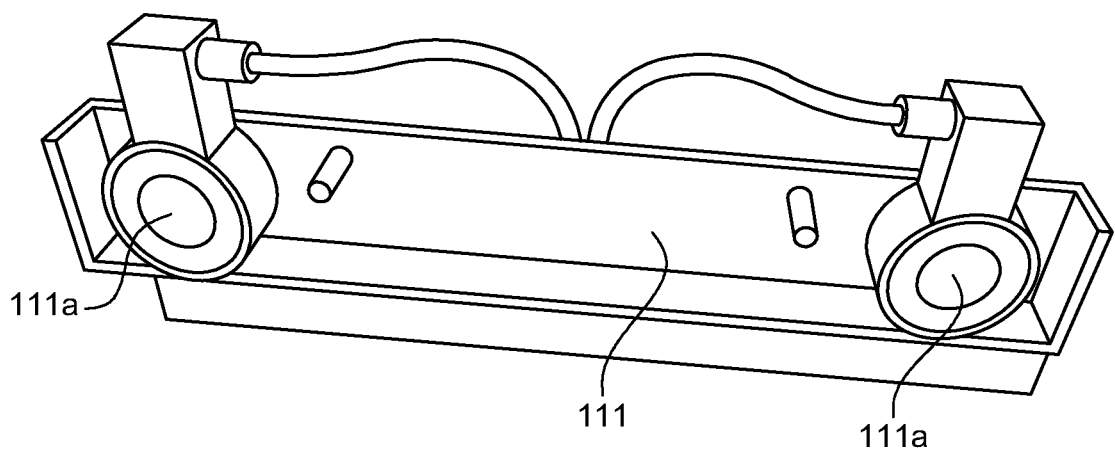
FIG. 7 is a representation of the of the docking module.

Finally, the external racking device 100 may comprise a docking module 111 (FIGS. 2, 3 and 7). In particular, the docking module 111 is arranged to detect the docking of the external racking device 100 in front of the cabinet 200.

Notably, the docking module is configured to permit the operation of the external racking device only when said device 100 is properly docked to the cabinet 200.

The docking module 111 may comprise at least on electromagnet 111a (FIG. 7) configured to maintain the external racking device against the cabinet while operating a racking in or a racking out operation.

The external racking device according to the present invention, and in particular the monitoring means, renders the racking in and racking out of the circuit breaker safer than known prior art external racking devices.

Furthermore, the electrical torque limiter, which responds very quickly to an overload exerted by the shaft, strongly reduces the risk of damages on the racking mechanism of the circuit breaker.

The external racking device according to the present invention is advantageously implemented wherein service availability rate is critical for operations of installations such as data center, utilities, or any electro intensive operations.

The invention claimed is:

1. An external racking device for remotely racking in and racking out an electrical circuit breaker from a cabinet, the external racking device comprising a motor head equipped with an electric motor, said electric motor being provided with a rotating shaft ended with an adaptor, and arranged to be coupled with a racking mechanism of the electrical circuit breaker, so that when driven in rotation, the rotating shaft, depending of rotation, triggers either the racking in or the racking out of the electrical circuit breaker from the cabinet, the external racking device further comprising a monitoring means configured to enable or to disable an operation of the electric motor depending on a status of the electrical circuit breaker and/or a switchgear to be racked in or racked out from the cabinet, wherein the monitoring means is configured to receive the status from the electrical circuit breaker and/or the switchgear such that the electrical circuit breaker and/or the switchgear provides the status to the monitoring means.

2. The external racking device according to claim 1, wherein the monitoring means comprise a wire connectable to the electrical circuit breaker and/or the switchgear to be the racked in or the racked out.

3. The external racking device according to claim 1, wherein the monitoring means is configured to monitor parameters related to the status of a position of the electrical circuit breaker and/or a position of the switchgear in the cabinet.

4. The external racking device according to claim 1, wherein the electric motor is further provided with an electrical torque limiter configured to stop the electric motor when said electric motor exerts a torque above a predetermined threshold.

5. The external racking device according to claim 4, wherein the electrical torque limiter is further configured to constantly evaluate the torque exerted by the rotating shaft while the external racking device is in operation.

6. The external racking device according to claim 5, wherein the torque is evaluated via measurements of a current feeding the electric motor so that when said current exceeds a predetermined current the operation of the external racking device is interrupted.

7. The external racking device according to claim 1, wherein the external racking device comprises a human machine interface for setting said external racking device.

8. The external racking device according to claim 1, wherein the external racking device comprise a wireless remote control for controlling the racking in and the racking out operation.

9. The external racking device according to claim 1, wherein the external racking device further comprises a chassis supporting the motor head, and a control box of the electric motor.

10. The external racking device according to claim 9, wherein the chassis comprises a base provided with at least one upward element extending upwardly from the base and supporting the motor head.

11. The external racking device according to claim 10, wherein the motor head is arranged so that its height can be adjusted by sliding said motor head along the upward element.

12. The external racking device according to claim 9, wherein the external racking device further comprises wheels coupled to the base to permit a wheeled movement of the chassis.

13. The external racking device according to claim 1, wherein the external racking device further comprises a power means for powering the motor head.

14. The external racking device according to claim 13, wherein the power means comprise a rechargeable battery associated with a built in charger.

15. The external racking device according to claim 1, wherein the external racking device further comprises a docking module configured to detect a docking of the external racking device in front of the cabinet.

16. The external racking device according to claim 15, wherein the docking module is configured to permit the operation of the external racking device only when said external racking device is properly docked to the cabinet, wherein the docking module comprises at least one electromagnet configured to maintain the external racking device against the cabinet while operating the racking in or the racking out operation.

17. A method for racking in and/or racking out an electrical circuit breaker from a cabinet, and implementing the external racking device according to claim 1, the method comprising:
coupling the rotating shaft ended with the adaptor with the racking mechanism of the electrical circuit breaker;
determining the status of the electrical circuit breaker via the monitoring means, wherein the status is received from the circuit breaker and/or the switchgear such that the electrical circuit breaker and/or the switchgear provides the status to the monitoring module;
enabling or disabling the operation of the electric motor of the external racking device depending on the status; and
operating the rack in or the rack out operation in case the operation of the electric motor is enabled.

18. An external racking device for remotely racking in and racking out an electrical circuit breaker from a cabinet, the external racking device comprising a motor head equipped with an electric motor, said electric motor being provided with a rotating shaft ended with an adaptor, and arranged to be coupled with a racking mechanism of the electrical circuit breaker, so that when driven in rotation, the rotating shaft, depending of rotation, triggers either the racking in or the racking out of the electrical circuit breaker from the cabinet,
the external racking device further comprising a monitoring means configured to enable or to disable an operation of the electric motor depending on a status of the electrical circuit breaker and/or a switchgear to be racked in or racked out from the cabinet, wherein the monitoring means comprises a wire connectable to the electrical circuit breaker and/or the switchgear to be the racked in or the racked out.

* * * * *